United States Patent [19]

Deregibus

[11] Patent Number: 4,791,867

[45] Date of Patent: Dec. 20, 1988

[54] APPARATUS FOR POSITIONING THE CYLINDER IN A ROTARY PRINTING PRESS

[75] Inventor: Antonio Deregibus, Balzola, Italy

[73] Assignee: Officine Meccaniche G. Cerutti S.p.A., Casale Monferrato (AL), Italy

[21] Appl. No.: 844,862

[22] Filed: Mar. 27, 1986

[30] Foreign Application Priority Data

Mar. 27, 1985 [IT] Italy .............................. 20094 A/85

[51] Int. Cl.[4] ........................ B41F 13/00; F16C 23/10

[52] U.S. Cl. .................................... 101/212; 100/165; 242/181; 384/24; 101/216

[58] Field of Search ............... 101/247, 216, 218, 153, 101/352, 316, 212; 100/168; 242/180, 181; 384/24, 242

[56] References Cited

U.S. PATENT DOCUMENTS

| | | | |
|---|---|---|---|
| 2,204,352 | 6/1940 | Fuehrer | 384/24 |
| 2,365,683 | 12/1944 | Curtis et al. | 384/24 |
| 2,585,325 | 2/1952 | Imshaug | 101/352 X |
| 2,650,648 | 9/1953 | Nordmark et al. | 384/242 X |
| 3,557,689 | 1/1971 | Teplitz | 101/316 X |
| 3,986,454 | 10/1976 | Granger | 101/216 |
| 4,076,337 | 2/1978 | Childress | 384/24 |
| 4,076,338 | 2/1978 | Hisey | 384/24 |
| 4,402,557 | 9/1983 | Paasanen et al. | 384/24 |
| 4,625,642 | 12/1986 | Oespot et al. | 101/352 |

*Primary Examiner*—Edgar S. Burr

*Assistant Examiner*—James R. McDaniel

*Attorney, Agent, or Firm*—Peter K. Kontler

[57] ABSTRACT

The stubs at the ends of the printing cylinder in a rotary printing press can roll along the upper surfaces of two arms each of which carries a plate with two mutually inclined upwardly diverging grooves for a pair of reciprocable stops. The stops can be shifted by cams to assume operative positions in which they flank the respective stubs and maintain them in predetermined positions for attachment of bearings to or for removal of bearings from the stubs. The stops are retractible to levels below the upper surfaces of the respective arms so as to allow for rolling of the stubs along the arms, either to advance the cylinder to its operative position or to roll the cylinder to a position in which it can be lifted off the arms. Detents are provided to yieldably hold the stops in selected positions.

14 Claims, 3 Drawing Sheets

APPARATUS FOR POSITIONING THE CYLINDER IN A ROTARY PRINTING PRESS

BACKGROUND OF THE INVENTION

The present invention relates to printing presses in general, and more particularly to improvements in means for positioning or locating the printing cylinder in the frame of a rotary printing press.

As a rule, the end portions of the printing cylinder in a rotary printing press are carried by arms which are movably mounted on the corresponding uprights of the machine frame. The arms are pivotable to and from their operative (normally horizontal) positions and can be locked in the operative positions. The printing cylinder can be lifted off or deposited onto the arms upon completion of several preliminary operations involving detachment of the cylinder from certain parts of the press and rolling the end portions of the cylinder along and toward the free end portions of the respective arms. When the cylinder reaches a predetermined position, the antifriction bearings which are carried by its stubs can be detached and the detached bearings are then deposited on suitable supports which are provided in the frame of the printing press adjacent to the stubs in the predetermined position of the cylinder. The rolling movement is thereupon resumed so that the stubs of the cylinder reach the end portions of the respective arms and can be lifted by a wheel-mounted elevator or the like.

The mounting of a fresh printing cylinder in the frame of a rotary printing press involves the placing of stubs onto the free end portions of the arms so that the stubs can begin to roll along the generally horizontal supporting surfaces of the arms. The rolling movement is interrupted when the cylinder reaches its predetermined position in which the stubs are properly aligned with the respective antifriction (e.g., ball) bearings. When the assembly of bearings with the stubs is completed, the cylinder is again set in rolling motion so as to advance toward and to assume its operative position.

It is desirable and important to properly locate the printing cylinder in the aforementioned predetermined position so as to ensure that the bearings can be readily and predictably slipped into or detached from the respective stubs. Moreover, the means for holding the cylinder in its predetermined position must be designed in such a way that it allows for practically unobstructed and smooth advancement of the cylinder toward as well as away from this position. Furthermore, it is important to ensure that the movement of the cylinder to and from its predetermined position should be completed within short intervals of time.

Heretofore known proposals to facilitate movements of the printing cylinder to and from its predetermined position include the provision of two levers each of which is pivotable relative to the corresponding arm and defines a socket for reception of the adjacent stub when the cylinder reaches that (predetermined) position in which the bearings can be readily mounted on or detached from the respective stubs. The levers cooperate with means for releasably blocking them in selected positions, and the levers are mounted on a guide rail so as to enable them to assume a plurality of different positions, i.e., the printing cylinder can be arrested and held in a selected one of several positions at different distances from the operative position. A drawback of such proposal is that the levers must be manipulated by hand, not only to enable them to block the movements of a cylinder from its operative position but also to shift the levers with or relative to the guide rail so as to select that position of the cylinder in which the bearings can be readily mounted on or detached from the respective stubs.

Another drawback of the just discussed proposal is that the means for mounting the levers is disposed between the head end of the cylinder and an inner wall of the lateral upright of the machine frame. Any manipulation by hand can entail injury to the operator. Still another drawback of such proposal is that, if the setting of the blocking means for the levers is improper, the cylinder cannot be rolled and/or otherwise manipulated which can bring about extensive lengthening of the intervals of manipulation of the cylinder, either for the purpose of removing it from or for the purpose of installing it in the frame of a rotary printing press or a like machine.

OBJECTS AND SUMMARY OF THE INVENTION

An object of the invention is to provide a novel and improved apparatus for locating a printing cylinder in a predetermined position in a simple, time-saving and reliable way.

Another object of the invention is to provide an apparatus whose operation can be readily automated to a desired extent and which comprises a relatively small number of simple and inexpensive parts.

A further object of the invention is to provide a compact apparatus which can be installed in existing rotary printing presses and like machines as a superior substitute for the aforediscussed and other conventional apparatus.

An additional object of the invention is to provide an apparatus wherein the parts which must, should or can be actuated by hand are readily accessible and their manipulation does not involve any danger to the attendants.

Still another object of the invention is to provide the apparatus with novel and improved means for automatically terminating the rolling movement of the stubs of a printing cylinder as soon as the stubs assume their optimum positions for attachment of antifriction bearings or for removal of such bearings.

The improved apparatus serves to position a printing cylinder of the type having a larger-diameter central portion and coaxial first and second end portions (hereinafter called stubs for short) which extend axially beyond the ends of the central portion. The apparatus comprises first and second carriers which respectively have coplanar first and second supporting surfaces along which the corresponding stubs can roll relative to the carriers, and a pair of stops provided on each of the carriers and having end portions extending upwardly beyond the respective surface and defining for the corresponding stub a seat wherein the stub is held against rolling movement along the respective surface At least one stop of each pair of stops is movable to an inoperative position in which its end portion does not extend upwardly beyond the respective supporting surface so that the corresponding stub is then free to roll along the corresponding carrier, and the apparatus further comprises means for moving the movable stops relative to the corresponding carriers.

Each of the carriers is preferably provided with elongated guide means and the movable stops are then reciprocable along the guide means of the corresponding carriers. The stops of each pair have mutually inclined edge faces bounding the respective seat and diverging in a direction upwardly and away from the respective supporting surface when the end portions of the movable stops extend upwardly beyond such surfaces The moving means can comprise cams which are mounted in or on and are rotatable relative to the carriers. The movable stops are then provided with followers which track the respective cams.

In accordance with a presently preferred embodiment of the invention, each of the stops is movable to and from an inoperative position in which its end portion does not extend upwardly beyond the respective supporting surface. The stops which form a pair can but need not simultaneously assume their inoperative positions, i.e., the end portion of one stop of each pair can extend beyond the corresponding supporting while the end portion of the other stop of the pair is disposed at a level below such surface, and vice versa.

Each carrier can comprise an arm which is or can be pivotably mounted in the frame of a printing press in a manner as known from conventional apparatus, and a substantially plate-like member. The guide means can comprise grooves which are machined into or are otherwise formed in the members to reciprocably receive the respective pairs of stops. Each movable stop can be formed with an elongated closed slot and each carrier then further comprises a projection which extends into the corresponding slot to limit the extent to which the corresponding movable stop or stops are reciprocable with reference to their carriers. The slots preferably extend in the longitudinal direction of the respective grooves.

The moving means can comprise a shaft for each stub and an eccentric cam mounted on the shaft. The movable stops are then provided with followers which abut the respective cams. The shafts are rotatable (e.g., automatically, by hand or by the respective stubs) between first positions in which the end portions of the respective stops are disposed below the levels of the corresponding supporting surfaces and second positions in which the cams maintain the end portions of the respective stops above the respective supporting surfaces. Each movable stop can be caused to assume more than a single second position. In accordance with a presently preferred embodiment of the moving means, each cam has a substantially flat first surface which extends substantially diametrically of the respective shaft and a convex second surface which extends along an arc of approximately 180 degrees.

The moving means preferably further includes handles for rotating the shafts, and detent means for releasably holding each shaft in at least one position, e.g., in the second position. Each detent means can comprise a spring-biased sphere mounted on each of the shafts and at least one recess provided on the respective carrier and dimensioned to receive a portion of the sphere in the selected position of the corresponding shaft.

The movable stops can be formed with top faces which are flush with the respective supporting surfaces in the inoperative positions of the movable stops. The lower end portions of the stops preferably constitute the aforementioned followers and the lower end portions of each pair of stops preferably define a compartment for the respective cam. This results in a space-saving design, protects the cams against premature contamination, and renders it less likely that a careless or inexperienced operator could injure her or his hand.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
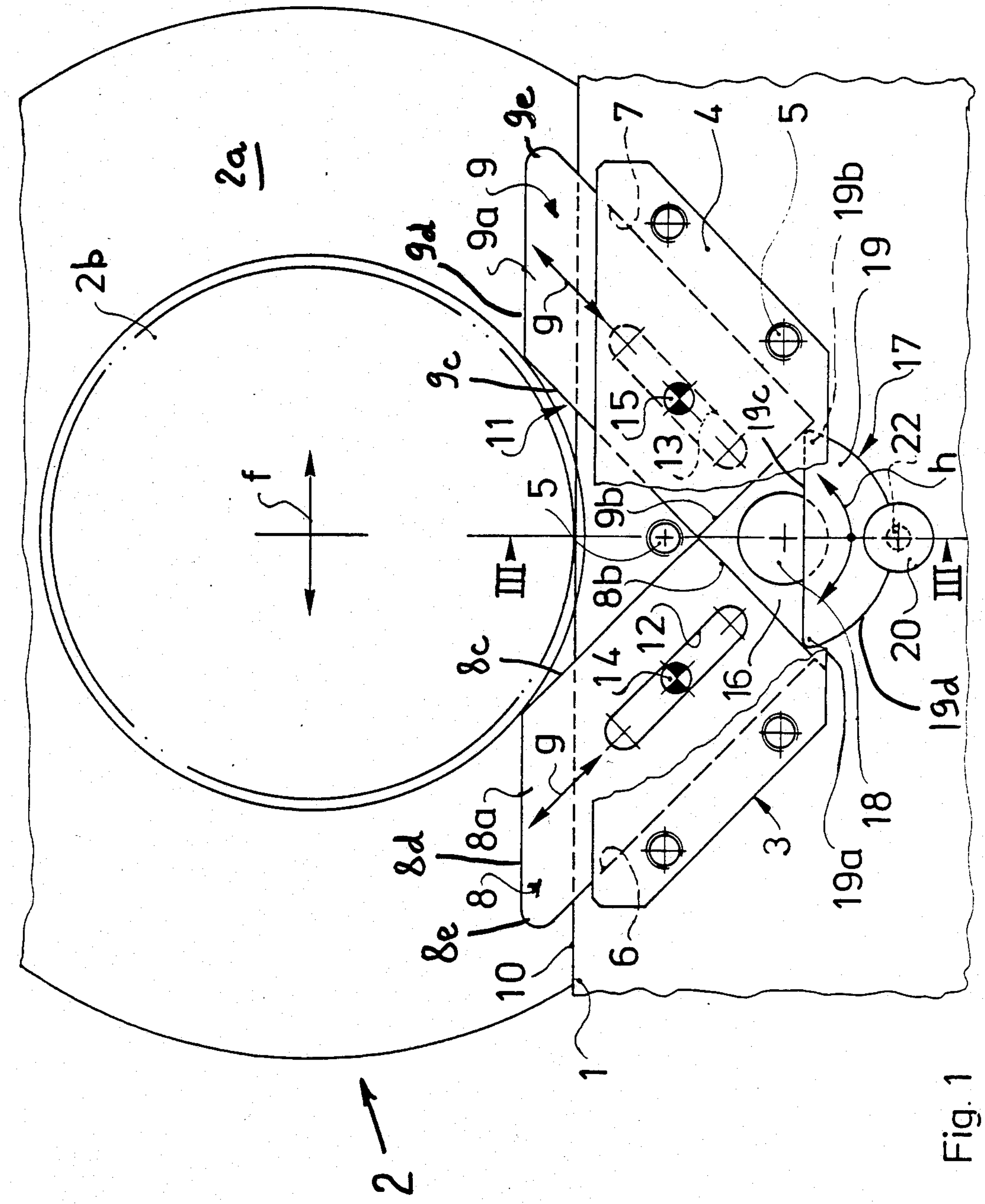
FIG. 1 is an end elevational view of a printing cylinder and a front elevational view of one-half of the improved apparatus, the stops on the illustrated carrier being held in their operative positions in which the corresponding stub is held against rolling movement along the supporting surface of the carrier and a portion of the plate-like member of the carrier being broken away.

The apparatus which is shown in FIG. 1 is used to position a printing cylinder 2 which includes a larger-diameter cylindrical central portion or section 2*a* and two coaxial smaller-diameter end portions or stubs 2*b* which extend beyond the opposite axial ends of the central portion 2*a*. The purpose of the apparatus is to facilitate movements of the printing cylinder 2 to and from a predetermined position (shown in FIG. 1) in which antifriction bearings (not shown) can be readily slipped onto or removed from the stubs 2*b*.

The apparatus comprises two spaced-apart carriers 3 each of which includes an arm 1 and a plate-like member 4 affixed to the outer side of the respective arm 1. The arms 1 are movable (preferably pivotable) between inoperative (vertical) positions and operative (horizontal) positions. The arm 1 of FIG. 1 is held in the operative position in which its supporting surface 10 is horizontal or substantially horizontal and, in the absence of any obstructions, allows the corresponding stub 2*b* to roll therealong toward and away from the predetermined position of FIG. 1. A carrier 3 (including an arm 1 and a plate-like member 4) is provided at each axial end of the central portion 2*a* of the printing cylinder 2. In the absence of aforementioned obstructions, the stubs 2*b* can roll along the respective surfaces 10 in a direction to the left or in a direction to the right (note the double-headed arrow f in FIG. 1).

The plate-like members 4 have inner sides which face the respective arms 1 and are formed with pairs of mutually inclined elongated guide grooves 6, 7 for discrete reciprocable strip-shaped stops 8 and 9, respectively. The members 4 are affixed to the adjacent arms 1 by screws 5 or analogous fasteners. The guide grooves 6, 7 together form a substantially V-shaped guide whose legs make an angle which may but need not equal or approximate 90 degrees. The upper end portions 8*a*, 9*a* of the stops 8, 9 normally extend upwardly and beyond the supporting surface 10 of the respective arm 1 so that they flank the corresponding stub 2*b* and hold the latter against any rolling movement along the supporting surface 10, i.e., the stub 2*b* is then held in a predetermined position in which an operator or a machine can readily apply or remove the antifriction bearings. The grooves 6 and 7 can be formed by removing material from the respective (inner) sides of the plate-like members 4. The directions in which the stops 8, 9 are reciprocable in their respective grooves 6, 7 are indicated by double-headed arrows g. It is within the purview of the invention to simplify the improved apparatus by fixedly mounting one of the stops 8, 9 in its operative position (as shown in FIG. 1) and by mounting the other stop of each pair for movement to and from an inoperative or retracted position in which the upper end portion of such stop does not extend upwardly beyond the respective supporting surface 10. In such modified apparatus, the cylinder 2 can be moved to and from its predetermined position by moving toward or away from the fixedly mounted stop, e.g., toward and from the stop 9 if the latter is permanently or nonmovably secured to the plate-like member 4 and/or to the arm 1 of the respective carrier 3.

When the stops 8 and 9 are held in the positions which are shown in FIG. 1, their edge faces 8*c*, 9*c* define a substantially V-shaped seat 11 in that they extend beyond the respective supporting surface 10 and diverge upwardly and outwardly so as to abut the surface of the respective stub 2*b* at a level above the surface 10.

The means for limiting the extent of reciprocatory movement of the stops 8, 9 in their grooves 7, 8 comprises two projections 14, 15 in the form of pins which are provided on the arms 1 or on the members 4 of the two carriers 3 and extend into elongated closed windows or slots 12, 13 of the stops 8, 9, respectively. The stops 12, 13 extend in the directions which are indicated by the respective arrows g, i.e., longitudinally of the respective grooves in the plate-like members 4.

The end portions 8*a*, 9*a* of the stops 8, 9 have horizontal top faces 8*d*, 9*d* which are flush with the respective supporting surfaces 10 in the inoperative or retracted positions of the stops. This ensures that the stubs 2*b*, can roll along practically uninterrupted supporting surfaces during movement of the cylinder 2 toward or away from the predetermined position of FIG. 1.

The lower end portions 8*b*, 9*b* of the stops 8 and 9 define a compartment 16 for reception of means 17 for moving the stops between their inoperative and operative positions. To this end, the end faces of the lower end portions 8*b*, 9*b* make an acute, right or obtuse angle and such lower end portions act not unlike followers which track the surfaces of the corresponding disc-shaped cam 19 forming part of the moving means 17.

The moving means 17 further comprises two shafts 18 (or a single shaft having a first portion journalled in one of the arms 1 and a second portion journalled in the other arm) which carry the respective disc cams 19. Each disc cam 19 resembles one-half of a circular disc and has a first surface 19*c* extending substantially diametrically of the respective shaft 18 and a convex surface 19*d* which extends along an arc of substantially 180 degrees. It will be noted that the cams 19 are or can be at least slightly eccentric with reference to their shafts 18. Each cam 19 carries a handle 20 which can be grasped by hand to facilitate effortless angular displacement of the corresponding shaft 18 between a first position (shown in FIG. 1) in which the end portions 8*a*, 9*a* of the stops 8, 9 extend upwardly beyond the respective supporting surface 10, and at least one second position in which the stop 8 and/or 9 is free to move to its inoperative position under the action of gravity and/or under the weight of the corresponding stub 2*b*. In the illustrated embodiment of the improved apparatus, the handles 20 are used to move the respective shafts 18*b* between three different positions including the first position of FIG. 1, a second position which is shown in FIG. 2 by solid lines, and a third position which is a mirror image of the second position.

In FIG. 1, the end portions or lobes 19*a*, 19*b* of the cam 19 abut the faces of the respective end portions or followers 8*b*, 9*b* to hold the stops 8 and 9 in their operative positions, i.e., the stub 2*b* is held against any rolling movement relative to the supporting surface 10. If the handle 20 is then used to turn the cam 19 to the solid-line position of FIG. 2, the cam surface 19*c* lies flush against the face of the follower 8*b* and extends substantially at right angles to the face of the follower 9*b*. Therefore, the stop 8 is free to assume its inoperative position (shown in FIG. 2 by solid lines) and the stop 9 is held in its uppermost position in which its end portion 9*a* is disposed at a level higher than that shown in FIG. 1. The stop 9 is held in such uppermost position by the lobe 19*b* of the cam 19; the lobe 19*a* does not bear upon the face of the follower 8*b*.

Figure 2:
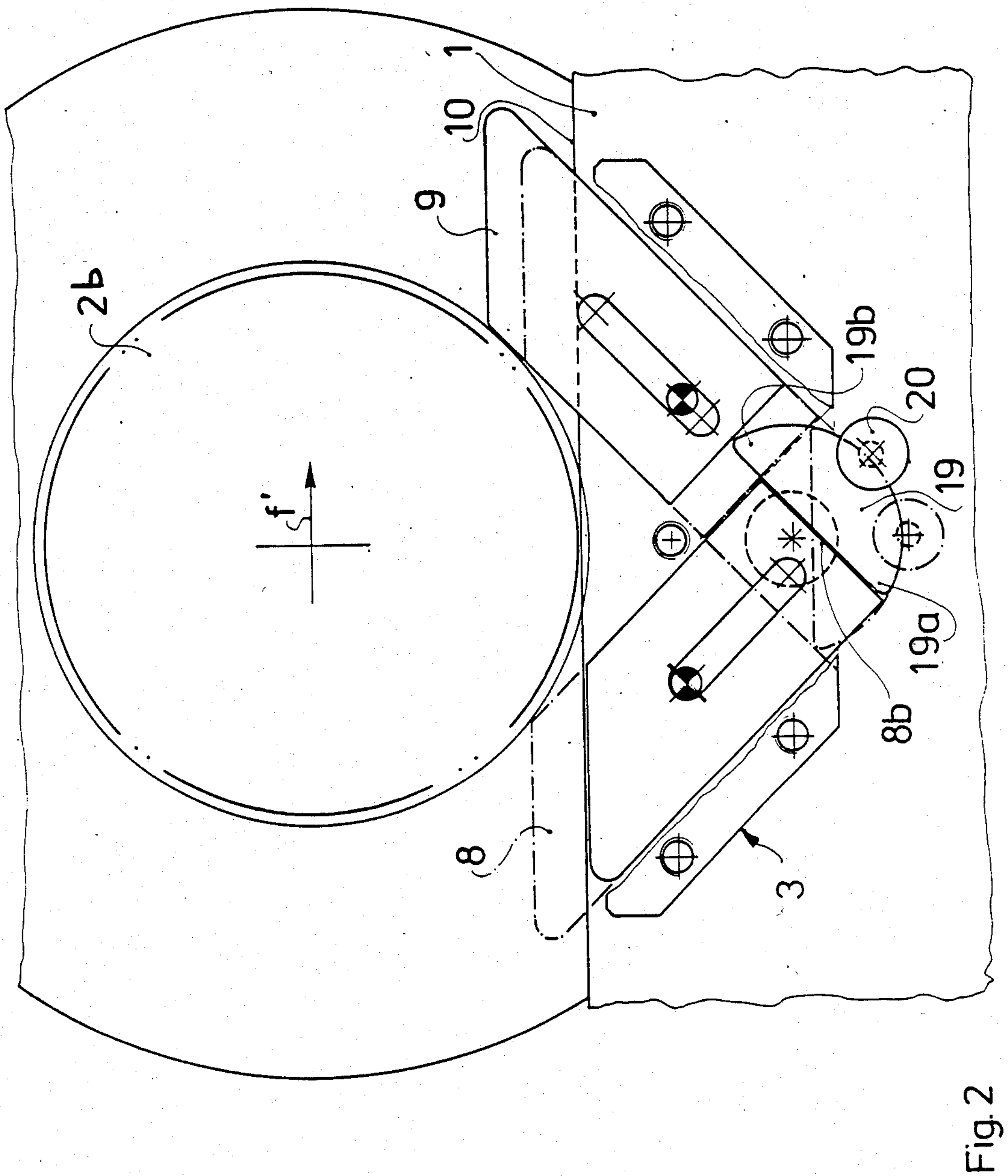
FIG. 2 illustrates the structure of FIG. 1 but with the left-hand stop held in its inoperative position, the operative positions of the stops being shown by phantom lines.
Figure 4:
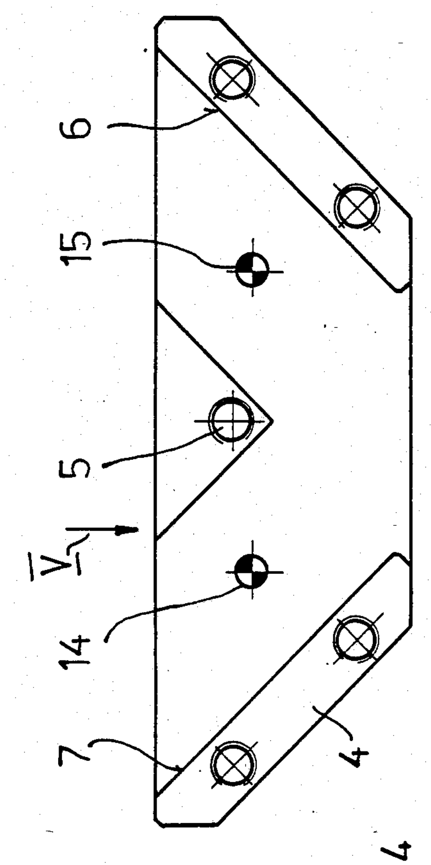
FIG. 4 is an elevational view of one plate-like member as seen in the direction of arrow IV in FIG. 3.
Figure 5:
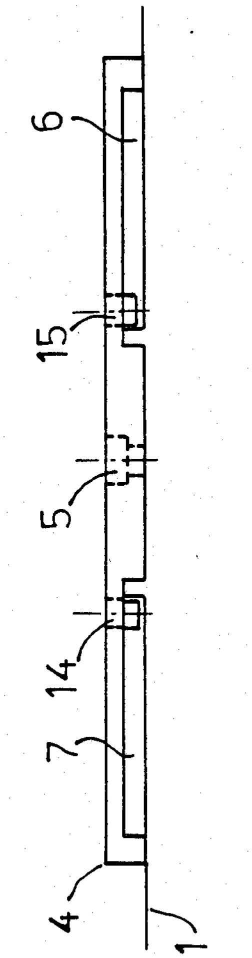
FIG. 5 is a view as seen in the direction of arrow V in FIG. 4.

If the operator thereupon wishes to return the stops 8 and 9 to the positions of FIG. 1, the handle 20 of FIG. 2 is moved in a counterclockwise direction so that the cam 19 reassumes the position of FIG. 1 (shown in FIG. 2 by phantom lines). Each of the end portions 8*a*, 9*a* then extends upwardly and beyond the supporting surface 10 of the respective carrier 3 (including the corresponding arm 1 and the corresponding plate-like member 4).

If the operator wishes to retract the end portion 9*a* of the stop 9, the cam 19 is rotated clockwise (starting from the position of FIG. 1) so that the cam surface 19*c* abuts the face of tee follower 9*b* and the lobe 19*a* bears against the central portion of the face of the follower 8*a*. The end portion 8*a* then rises to a level above that which is shown in FIG. 1, and the end portion 9*a* is retracted so that its top face 9*d* is flush with the supporting surface 10.

Figure 3:
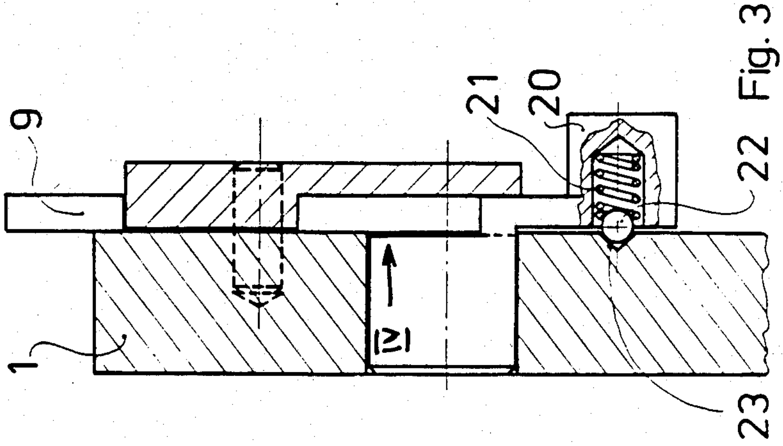
FIG. 3 is an enlarged fragmentary vertical sectional view as seen in the direction of arrows from the line III—III of FIG. 1.

The apparatus is preferably further provided with detent means (see particularly FIG. 3) which serves to releasably hold the cams 19 and their shafts 18 in selected angular positions. The illustrated detent means comprises a sphere 22 which is installed in a blind bore of the handle 20 and is biased toward the open end of the bore by a coil spring 21. The diameter of the open end of the bore is slightly smaller than the diameter of the sphere 22 so that the latter cannot escape from the handle 20. A recess or socket 23 in the arm 1 receives the projecting portion of the sphere 22 when the cam 19 is moved to the selected angular position. The arm 1 can be provided with two or more recesses 23, one for each of those angular positions in which the respective cam 19 is to be held against unintentional or accidental movement to a different angular position. The directions in which the handle 20 can turn the respective shaft 18 are indicated by the double-headed arrow h of FIG. 1.

The stops 8 and 9 are reciprocable in their guide grooves 6 and 7 with a play which is barely sufficient to allow for unobstructed reciprocatory movements of the stops under the action of gravity or under the action of the respective cams 19 so as to ensure that the followers 8*b* and 9*b* remain in abutment with the adjacent cams.

The handles 20 can be readily positioned in such a way that they are accessible to the hand of an operator without risking injury to the hand. As shown, the handles 20 can be located at a maximum distance from the followers 8*b* 9*b* of the respective pairs of stops 8, 9 when such stops maintain the corresponding stubs 2*b* in their predetermined positions.

The manner in which the arms 1 of the carriers 3 can be pivoted between their illustrated positions and other positions is or can be the same as in conventional apparatus.

The improved apparatus is operated as follows:

Let it be assumed that the cam 19 and the stops 8, 9 are held in the positions of FIG. 1 and that the stubs 2*b* of the cylinder 2 are located to the left of the upper end portions 8*a* of the stops 8 and roll along the respective supporting surfaces 10 toward their predetermined positions (as shown in FIG. 1 by solid lines). The oncoming stubs 2*b* engage the rounded parts 8*e* of the respective end portions 8*a* and depress the respective stops 8 to the solid-line positions of FIG. 2 whereby the angular position of each cam 19 changes, i.e., the faces of the followers 8*b* abut the surfaces 19*c* of the respective cams 19. The stops 9 are automatically compelled to assume their uppermost positions (note the solid-line position of the stop 9 which is shown in FIG. 2). The stubs 2*b* are then free to roll along the top faces 8*d* of the respective stops 8 and toward abutment with the edge faces 9*c* of the respective stops 9. The direction of such rolling movement is denoted in FIG. 2 by the arrow f'.

When the stubs 2*b* reach the respective edge faces 9*c*, the operator or an automatically operated servomotor returns the cams 19 to the positions of FIG. 1, i.e., the stops 9 descend from their upper end positions to their operative (standard) positions corresponding to that of the stop 9 shown in FIG. 1 whereby the stops 8 rise and their upper end portions 8*a* effectively prevent any movement of the stubs 2*b* counter to the direction which is indicated by the arrow f'. Each stub 2*b* then abuts the respective edge faces 8*c*, 9*c* and is positively held in that predetermined position in which the antifriction bearings can be slipped onto or removed from the stubs.

If the stubs 2*b* are initially supported by the surfaces 10 to the right of the end portions 9*a* (while the stops 8 and 9 are held in the positions of FIG. 1), the stubs 2*b* depress the end portions 9*a* by acting upon the respective rounded tips 9*e* whereby the top faces 9*d* descend to the levels of the respective supporting surfaces 10 and the stops 8 are caused to assume their upper end positions (corresponding to the solid-line position of the stop 9 in FIG. 2). The manner in which the cams 19 are thereupon rotated to enable the stops 8 to descend and to cause the stops 9 to rise to the positions which are shown in FIG. 1 is analogous to that described in connection with manipulation of such stops during rolling of stubs 2*b* against the stops 8 and thereupon along the top faces 8*d*.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for positioning a printing cylinder of the type having a larger-diameter central portion and coaxial first and second stubs extending axially beyond the central portion, comprising first and second carriers respectively having coplanar first and second supporting surfaces along which the corresponding stubs can roll relative to said carriers, each of said carriers further having elongated guide means; a pair of stops provided on each of said carriers and having end portions extending upwardly beyond the respective surface and defining for the corresponding stub a seat wherein the stub is held against rolling movements along the respective surface, at least one stop of each pair being reciprocable along the guide means of the corresponding carrier and being movable to an inoperative position in which its end portion does not extend upwardly beyond the respective surface so that the corresponding stub is then free to roll along the corresponding carrier, the stops of each pair having mutually inclined faces bounding the respective seat and diverging in a direction upwardly and away from the respective surface when the end portion of the movable stop extends upwardly beyond such surface; and means for moving said movable stops relative to the corresponding carriers, said moving means comprising cams mounted on and rotatable relative to said carriers, said movable stops having follower which track the respective cams.

2. The apparatus of claim 1,, wherein each of said carriers has elongated guide means and said movable stops are reciprocable along the guide means of the corresponding carriers, the stops of each pair having mutually inclined faces bounding the respective seat and diverging in a direction upwardly and away from the respective surface when the end portion of the movable stop extends upwardly beyond such surface.

3. The apparatus of claim 1, wherein each of said stops is movable to and from an inoperative position in which its end portion does not extend upwardly beyond the respective surface.

4. The apparatus of claim 1, wherein each of said carriers comprises a substantially plate-like member and said guide means includes a groove provided in each of said plate-like members.

5. The apparatus of claim 4, wherein each movable stop has an elongated slot and each of said carriers further comprises a projection extending into the slot of the respective movable stop to limit the extent of movability of the movable stop with reference to its carrier.

6. The apparatus of claim 1, wherein said movable stops are reciprocable relative to their carriers and said guide means have elongated grooves for such movable stops, each of said movable stops having an elongated slot extending in the longitudinal direction of the respective groove and said carriers having projections extending into the corresponding slots to limit the extent of reciprocability of said movable stops.

7. The apparatus of claim 5, wherein each of said cams has a peripheral surface including a first portion extending substantially diametrically of the respective shaft and a convex second portion extending along an arc of approximately 180 degrees.

8. The apparatus of claim 5, wherein said moving means further comprises handles for rotating said shafts.

9. The apparatus of claim 5, further comprising detent means for releasably holding said shafts in at least one of said first and second positions thereof 10. The apparatus of claim 9, wherein each of said detent means comprises a spring-biased sphere mounted on each of said shafts and a recess which receives the sphere in the one position of the respective shaft.

11. The apparatus of claim 1, wherein said movable stops have elongated windows, said carriers having means for limiting the extent of reciprocability of the respective movable stops and such limiting means including projections extending into the respective windows.

12. The apparatus of claim 1, wherein the end portions of said movable stops have top faces which are flush with the respective surfaces in the inoperative positions of the movable stops.

13. Apparatus for positioning a printing cylinder of the type having a larger-diameter central portion and coaxial first and second stubs extending axially beyond the central portion, comprising first and second carriers respectively having coplanar first and second supporting surfaces along which the corresponding stubs can roll relative to said carriers, each of said carriers further having elongated guide means; a pair of stops provided on each of said carriers and having end portions extending upwardly beyond the respective surface and defining for the corresponding stub a seat wherein the stub is held against rolling movement along the respective surface, at least one stop of each pair being reciprocable along the guide means of the corresponding carrier and being movable to an inoperative position in which its end portion does not extend upwardly beyond the respective surface so that the corresponding stub is then free to roll along the corresponding carrier, the stops of each pair having mutually inclined faces bounding the respective seat and diverging in a direction upwardly and away from the respective surface when the end portion of the movable stop extends upwardly beyond such surface; and means for moving said movable stops relative to the corresponding carriers, said moving means comprising a shaft rotatably journalled in each of said carriers and an eccentric cam mounted on the shaft, said movable stops having followers which abut the respective cams, each of said shafts being rotatable between a first position in which the end portion of the respective movable stop assumes its inoperative position and at least one second position in which the cam maintains the end portion of the respective movable stop at a level above the respective surface.

14. Apparatus for positioning a printing cylinder of the type having a larger-diameter central portion and coaxial first and second stubs extending axially beyond the central portion, comprising first and second carriers respectively having coplanar first and second supporting surfaces along which the corresponding stubs can roll relative to said carriers; a pair of stops provided on each of said carriers and having end portions extending upwardly beyond the respective surface and defining for the corresponding stub a seat wherein the stub is held against rolling movement along the respective surface, all of said stops being reciprocable relative to the corresponding carriers to and from inoperative positions in which their end portions do not extend upwardly beyond the respective surfaces so that the corresponding stubs are then free to roll along the corresponding carriers, said stops having lower end portions and the lower end portions of each pair of stops defining a compartment; and means for moving the stops relative to the corresponding carriers said moving means comprising a rotary cam provided in each of said compartments and abutting the lower end portions of the respective pair of stops.

* * * * *